United States Patent
Lettow et al.

(10) Patent No.: US 12,363,799 B2
(45) Date of Patent: Jul. 15, 2025

(54) WIRELESS SIGNAL TRANSMISSION USING ACCESS POINT NETWORKS IN WEARABLE DEVICES

(71) Applicant: VORBECK MATERIALS CORP., Jessup, MD (US)

(72) Inventors: John S Lettow, Washington, DC (US); Sriram Manivannan, Baltimore, MD (US); Mathew A Hudspeth, Catonsville, MD (US); Trentice V Bolar, Columbia, MD (US)

(73) Assignee: VORBECK MATERIALS CORP.

(*) Notice: Subject to any disclaimer, the term of this patent is extended or adjusted under 35 U.S.C. 154(b) by 0 days.

(21) Appl. No.: 18/377,734

(22) Filed: Oct. 6, 2023

(65) Prior Publication Data

US 2025/0106941 A1    Mar. 27, 2025

Related U.S. Application Data

(63) Continuation of application No. 16/745,646, filed on Jan. 17, 2020, now Pat. No. 11,818,805, which is a
(Continued)

(51) Int. Cl.
*H04W 88/08*     (2009.01)
*G06F 1/16*      (2006.01)
(Continued)

(52) U.S. Cl.
CPC .......... *H04W 88/08* (2013.01); *G06F 1/163* (2013.01); *H04B 17/318* (2015.01);
(Continued)

(58) Field of Classification Search
CPC ..... H04W 88/08; H04W 76/15; H04W 76/14; H04W 36/30; H04W 52/245; H04W 12/06; H04W 4/008; H04W 4/80; H04B 17/318; H04B 1/3827; H04B 1/385; H04B 2001/3855; H04B 2001/3861; G06F 1/163; H04M 1/72412; H04M 2250/02;
(Continued)

(56) References Cited

U.S. PATENT DOCUMENTS

| | | | |
|---|---|---|---|
| 2010/0016745 A1* | 1/2010 | Crump | A61B 5/1117 340/539.12 |
| 2014/0106677 A1* | 4/2014 | Altman | H04W 4/80 455/552.1 |
| 2015/0237461 A1* | 8/2015 | Goyal | H04M 1/02 455/41.2 |

* cited by examiner

*Primary Examiner* — Rushil P. Sampat
(74) *Attorney, Agent, or Firm* — Woods Oviatt Gilman LLP; Trent V. Bolar, Esq.

(57) ABSTRACT

A wearable apparatus includes an antenna affixed to a surface of the apparatus. A device is conductively coupled to the antenna. A control circuit is communicatively coupled to a sensor, the device and, a communications device. The antenna includes a composition that includes a polymer and carbonaceous material made up of individual graphene sheets that are present in the polymer in a 3D percolated network. A mobile device is communicatively coupled to a cellular RF source via a first wireless signal. The control circuit is configured to communicate with the mobile device via a third RF signal; communicate with the RF source via a second RF signal; and cause the mobile device to communicate with the RF source via the third RF signal when the second RF signal is greater than the first RF signal.

7 Claims, 7 Drawing Sheets

Related U.S. Application Data continuation of application No. 15/764,262, filed as application No. PCT/US2016/043680 on Jul. 22, 2016, now abandoned.

(60) Provisional application No. 62/196,281, filed on Jul. 23, 2015.

(51) Int. Cl.
  *H04B 17/318* (2015.01)
  *H04W 36/30* (2009.01)
  *H04W 52/24* (2009.01)
  *H04W 76/14* (2018.01)
  *H04W 76/15* (2018.01)

(52) U.S. Cl.
  CPC ......... *H04W 36/30* (2013.01); *H04W 52/245* (2013.01); *H04W 76/14* (2018.02); *H04W 76/15* (2018.02)

(58) Field of Classification Search
  CPC .......... H04M 2250/06; H04M 2250/12; G08B 25/004; G08B 25/016; Y02D 30/70
  See application file for complete search history.

700

| OBJECT ID | COMPARE CYCLE 1 | COMPARE CYCLE 2 | COMPARE CYCLE n |
|---|---|---|---|
| SENSOR 1 | "yyyymmdd", "reading", "hh:mm:ss" | "yyyymmdd", "reading", "hh:mm:ss" | "yyyymmdd", "reading", "hh:mm:ss" |
| SENSOR 2 | "yyyymmdd", "reading", "hh:mm:ss" | "yyyymmdd", "reading", "hh:mm:ss" | "yyyymmdd", "reading", "hh:mm:ss" |

FIG. 7

WIRELESS SIGNAL TRANSMISSION USING ACCESS POINT NETWORKS IN WEARABLE DEVICES

CROSS-REFERENCE TO RELATED APPLICATIONS

This application is a continuation of U.S. patent application Ser. No. 16/745,646 filed Jan. 17, 2020, which is a continuation of U.S. patent application Ser. No. 15/764,262 filed Mar. 28, 2018, which is a 371 of International Application No. PCT/US16/43680 filed Jul. 22, 2016, which claims the benefit of Provisional Application No. 62/196,281 filed Jul. 23, 2015. These applications are hereby incorporated herein by reference in their entirety.

BACKGROUND

Wireless electronic devices are devices that can store, process, and/or transmit data and are generally perceived to be a part of modern life. For example, data can be wirelessly transmitted via radio frequency ("RF") signals. However, RF signal strength can be attenuated due to a variety of factors (e.g., distance between transmitter and receiver, electrically conductive materials, wave reflections, as well as other RF attenuating factors). Users of portable wireless electronic devices typically desire data transfer rates comparable to their home and/or primary networks.

BRIEF DESCRIPTION OF THE DRAWINGS

FIG. 7 illustrates a table structure of a logical table, in accordance with several embodiments.

DETAILED DESCRIPTION

Figure 1:
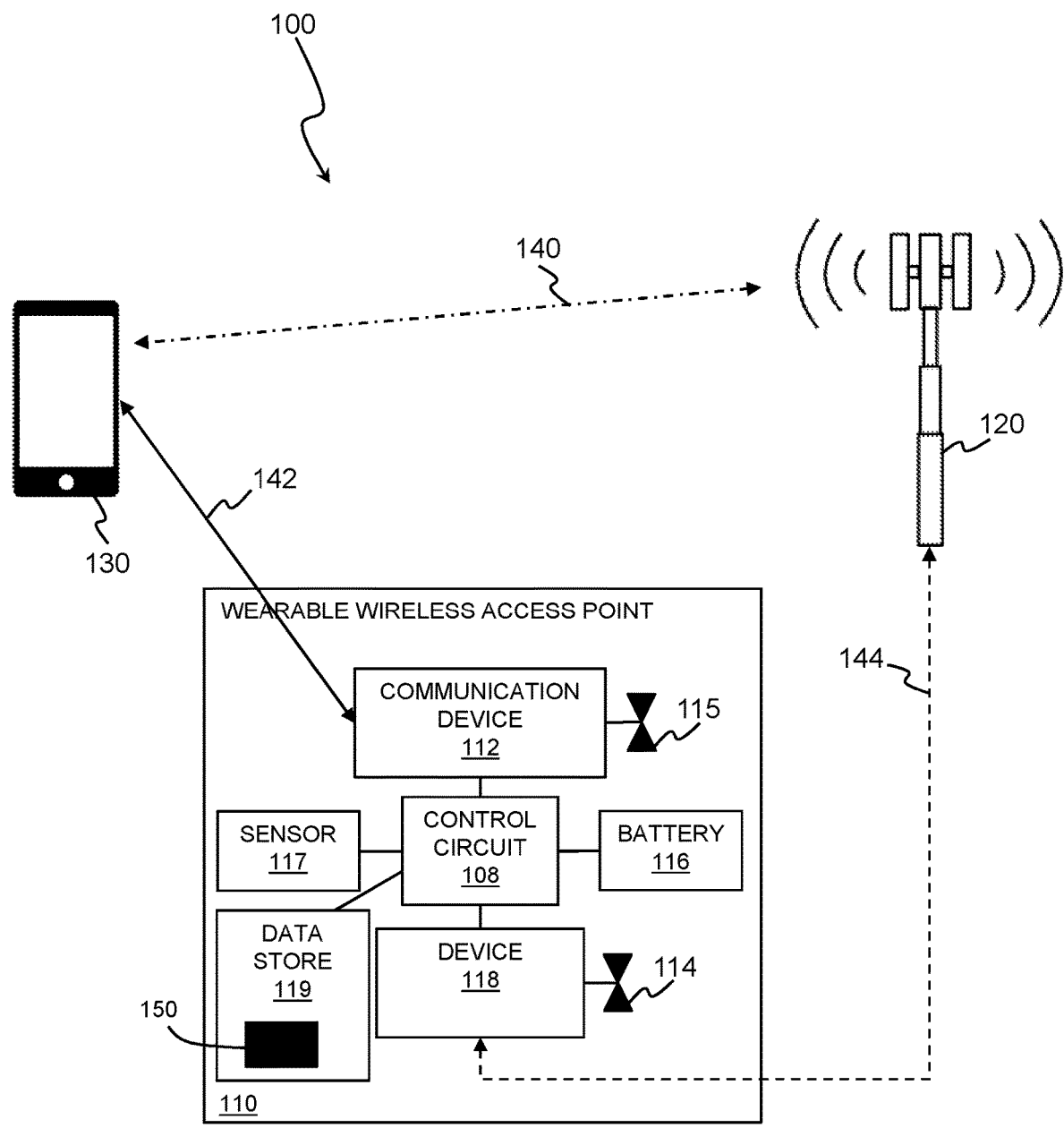
FIG. 1 illustrates a block diagram of an environment, generally 100, in accordance with some embodiments.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, devices, and methods are provided herein useful to enabling communication between computing devices. In some embodiments, the system comprises one or more radio frequency ("RF") sources included in a cellular network (e.g., cell site/tower, base transceiver station, telecommunication node, as well as any computing device that can transmit and/or receive RF's). Each mobile computing devices may be communicatively coupled to one of the RF sources via a first wireless signal received by the mobile computing device at a first signal strength. The first wireless signal can be modulated via a cellular communication protocol.

The system, for example, may also comprise one or more wearable items each having a surface(s). At least one antenna can be positioned proximate to one of the surfaces and comprise one or more conductor elements, in accordance with an embodiment. In some aspects, each conductor element may comprise a polymer(s) and fully exfoliated graphene sheets. In other embodiments, one or more control circuits can be positioned proximate to the surface and communicatively coupled to at least one of the antennas. In yet still other embodiments, at least one of the control circuit may be configured to communicate, via the antenna(s), with the RF source via a second wireless signal received by the antenna(s) at a second signal strength, the second wireless signal modulated via the cellular communication protocol(s).

For example, at least one of the control circuits may be configured to communicate, via a second antenna(s) communicatively coupled to the control circuit, with the mobile device(s) via a third wireless signal(s) received by the mobile device at a third signal strength, the third wireless signal modulated via a non-cellular wireless communication protocol(s). In some embodiments, the control circuit may be configured to cause each of the mobile devices to communicate with one of the RF sources via the third wireless signal(s) when the second signal strength is greater than the first signal strength.

In some embodiments, one or more of the antennas comprise a plurality of antennas conductively coupled together in one or more antenna arrays. For example, at least one of the control circuits may be configured to communicate, via one or more antennas of the plurality of antennas, with one or more of the RF sources via the second wireless signal, each of the plurality of antennas receiving the second wireless signal at a particular second signal strength; identify one or more antennas of the plurality of antennas receiving the second wireless signal at a strongest second signal strength; and deactivate the antennas of the plurality of antennas that are not identified.

In other embodiments, the control circuits can be configured to identify the antenna at predetermined intervals. The system may further comprise one or more sensors each configured to capture an acceleration of at least one of the antennas of the plurality of antennas, in accordance with several embodiments. For example, the step of identifying at least one of the antennas can comprise identifying, using sensor data, the antennas of the plurality of antennas when the captured acceleration data of the identified antenna exceeds a threshold rate. In still other embodiments, the step of identifying the antennas of the plurality of antennas receiving the second wireless signal at the strongest second signal strength can comprise comparing the second signal strength of each antenna of the plurality of antennas and thereby identify antennas of the plurality of antennas that are associated with the strongest second signal strength.

In yet still other embodiments, the step of identifying antennas of the plurality of antennas receiving the second wireless signal at the strongest second signal strength can comprise identifying antennas of the plurality of antennas receiving the particular second signal strength at a threshold signal strength or greater. In several embodiments, one or more of the control circuits can each be selectively (e.g., user-defined) positioned proximate to the surface (i.e., have various attachment points/sites on one or more surfaces of the wearable item). In other embodiments, one or more of the antennas can be selectively (e.g., user-defined) positioned proximate to the surface (i.e., have various attachment points/sites on one or more surfaces of the wearable item).

In additional embodiments, the system may further comprise one or more sensors each conductively coupled to at least one of the control circuits and configured to capture the second signal strength of one or more antennas of the plurality of antennas. For example, each control circuit can be configured to store the captured second signal strength in one or more logical tables each comprising: a plurality of logical rows each comprising an object identification number (OID) to identify that particular logical row, each logical row of the plurality of logical rows corresponding to a record of information; a plurality of logical columns intersecting the plurality of logical rows to define a plurality of logical cells, each logical column of the plurality of logical columns comprising an OID to identify that particular logical column; and one or more indexing elements each configured to index data stored in the logical table. In some embodiments, the logical table may function and be structured in a similar manner compared to the data storage and retrieval system In several embodiments, the method may comprise communicating, via a control circuit(s) communicatively coupled to at least one antenna, with a radio frequency ("RF") source(s) via a second wireless signal received by the antenna at a second signal strength, each of the RF sources can be communicatively coupled to one or more mobile devices via a first wireless signal, each mobile device can receive the first wireless signal at a first signal strength. For example, each of the control circuits can be positioned proximate to a surface of a wearable item, at least one of the RF sources can be included in at least one cellular network. Each antenna, for example, may comprise one or more conductor elements each comprising a polymer(s) and fully exfoliated graphene sheets.

In several embodiments, the method may comprise communicating, via the control circuit(s), with at least one of the mobile devices via a third wireless signal received by each of the mobile devices at third signal strength. In other embodiments, the method may comprise causing, via one or more of the control circuits, at least one of the mobile devices to communicate with one or more of the RF sources via the third wireless signal when the second signal strength is greater than the first signal strength. In yet still other embodiments, the step of communicating with at least one of the RF sources comprises communicating, via at least one of the control circuits communicatively coupled to the antenna, with at least one of the RF sources via the first wireless signal, at least one of the antennas can comprise a plurality of antennas conductively coupled together in one or more antenna arrays.

Here, for example, each of the plurality of antennas can receive the first wireless signal at one or more particular first signal strengths. In some embodiments, the step of communicating with at least one of the RF sources comprises identifying, via one or more of the control circuits, one or more antennas of the plurality of antennas receiving the first wireless signal at a strongest first signal strength; and deactivating, via one or more of the control circuits, at least one of the antennas of the plurality of antennas that is not an identified antenna.

In other embodiments, the step of identifying the antenna comprises comparing, via one or more of the control circuits, the first signal strength of each antenna of the plurality of antennas to one another thereby identifying antennas of the plurality of antennas receiving the first wireless signal at a strongest first signal strength. In yet still other embodiments, the step of identifying the antenna(s) comprises identifying, via at least one of the control circuits, at least one of the antennas of the plurality of antennas comprising a first signal strength greater than a threshold signal strength. In several embodiments, the method further comprises capturing, via one or more sensors communicatively coupled to at least one of the control circuits, an acceleration rate for one or more antennas of the plurality of antennas. In other embodiments, the step of identifying the antenna(s) can comprise identifying the antenna(s) of the plurality of antennas when the captured acceleration rate of the antenna exceeds a threshold rate.

In several embodiments, the method can comprise capturing, via one or more sensors each conductively coupled to one or more of the control circuits, the first signal strength of an antenna of the plurality of antennas; and storing, via one or more of the control circuit, the captured first signal strength in one or more logical tables. Here, for example, a logic table may comprise a plurality of logical rows each comprising one or more object identification numbers (OID) to identify that particular logical row (e.g., each logical row of the plurality of logical rows may correspond to one or more records of information); a pluralities of logical columns intersecting the plurality of logical rows to define a plurality of logical cells, each logical column of the plurality of logical columns can comprise one or more OIDs to identify that particular logical column; and one or more indexing elements that indexes data stored in one or more of the logical table.

Mobile devices, such as computing tablets, wearable computing devices, and cellular ("cell") phones, are generally perceived as a part of modern life. Mobile devices can communicate with other computing devices via electrical conductors (i.e., wired communication) and/or radio frequency ("RF") waves (i.e., wireless communication). In some aspects, mobile device users may desire the ability to engage in wireless communication (e.g., data transfer, data downloads, media streaming, etc.) regardless of their current environment. Users typically desire an ability to transfer data at a rate that is comparable to that achieved on their home/primary network. Users typically desire a signal strength capable of supporting such data transfers. However, data transfer rate typically deteriorate in relation to RF signal strength deterioration.

FIG. 1 illustrates a block diagram of a system to enable communication between computing devices, generally 100, in accordance with some embodiments. For example, system 100 may include one or more radio frequency ("RF") sources 120 and one or more computing devices 130, wherein each computing device can communicate with a RF source 120 via a transmission line 140. In some embodiments, source 120 can be a computing device that transmits and receives RF signals, such as a cell phone tower (i.e., a Base Transceiver Station). For example, RF source 120 can be a network equipment component that facilitates wireless communication between mobile devices, such as computing device 130, and a network, e.g., a cellular network. In some embodiments, RF source 120 can be a raised structure that supports one or more antennas as well as one or more sets of transmitters, receivers, transceivers, digital signal processors, control electronics, global positioning receivers for timing (e.g., CDMA2000/IS-95 or GSM systems) primary and backup electrical power sources, and sheltering. In other embodiments, RF source 120 can be a base transceiver station. For example, RF source 120 can transmit and/or receive one or more wireless signals that are modulated via one or more wireless communication protocols (e.g., GSM, CDMA, wireless local loop, Wi-Fi, WiMAX, a wide area network, a cellular communication protocol, as well as any wireless communication protocol that is compatible with mobile computing devices).

In certain embodiments, computing device 130 can be a mobile computing device that can transmit and/or receive data wirelessly. In some aspects, mobile computing devices are computing devices that can be held and operated in the user's hand. For example, computing device 130 can be a cellular phone, a computing tablet, a phablet, a wearable computing device, a laptop computer, a desktop computer, or any computing device that can transmit and/or receive data wirelessly with RF source 120. In some embodiments, computing device 130 can communicate wirelessly, e.g., RF source 120, using any appropriate IEEE protocol, such as 802.11 and/or 802.15

For example, signal strength can affect the quality of wireless communication between computing devices, e.g., computing device 130 and RF source 120. Signal strength can refer to the transmitter power as received by a reference antenna at a distance from the transmitting antenna and may be expressed in terms of dB-millivolts per meter ("dBmV/m") for high-powered transmissions, such as broadcasting, as well as dB-microvolts per meter ("dBµ V/m") or decibels above a reference level of one milliwatt ("dBm") for low-powered systems, such as mobile computing devices.

For example, although there are cell phone base stations installed across many nations globally, there may still exist areas having reduced RF reception (e.g., basements, building interiors, rural and/or urban areas having few or no base stations, an area having one or more environmental conditions that can reduce RF reception). Such environmental conditions may include, but are not limited to, weather, distance between receiver and transmitter, physical impediments such as fauna, buildings, being beyond or near the transmission range of source RF transmitters as well as structural impediments, such as walls and ceilings, which can block or reduce RF transmission rates, and similar physical structures Such environmental conditions may also include, but are not limited to, users being away from one's home network, in the case of mobile devices that only communicate via Wi-Fi or similar non-cellular IEEE communication protocols. For example, standard construction walls can reduce the RF transmission distance by up to 50%. Metal enclosures, reflective insulation materials, reflective window treatments, as well as RF interference can degrade RF signal strength.

In some embodiments, communication between computing device (e.g., computing devices 130 and RF sources 120) can be facilitated via wearable wireless access point ("WWAP") 110 (discussed below). In other embodiments, WWAP 110 can be an apparatus worn on the person of a mammal, such as a human, a canine, a cat, or a horse, that facilitates communication between computing devices (e.g., computing device 130 and RF source 120), in accordance with some embodiments. WWAP 110 can, for example, be a wearable container, e.g., baggage items or garment items. In some embodiments, applicable baggage items can include, but are not limited to, backpacks, suitcases, purses, shoulder bags, duffle bags, luggage, pouches, pocketbooks, and similar items. In certain embodiments, applicable garment items include, but are not limited to shirts, trousers, skirts, dresses, vests, uniform, headwear, collars, vests, saddles, harnesses, as well as any garment items that can be worn by mammals.

In some embodiments, WWAP 110 may comprise one or more communication devices 112, batteries 116, data stores 119, devices 118, and sensors 117 each conductively coupled to one or more control circuits 108. For example, control circuit 108 can be configured to perform one or more of the steps, functions, and/or procedures disclosed in the instant application. In certain embodiments, battery 116 is a power source that can comprises one or more electrochemical cells with external connections provided to power a device (e.g., the one or more control circuits 108). In other embodiments, battery 116 can be permanently or selectively affixed to the WWAP 110. In yet still other embodiments, battery 116 can comprise one or more primary cells and/or secondary cells. For example, battery 116 can be conductively coupled to solar panels (not shown), which may be affixed to one or more surfaces of WWAP 110.

In several embodiments, data store 119 can be an information repository for the storage and management of data (e.g., data captured by sensors 117). In certain embodiments, data store 119 comprises several interconnected repositories (e.g., parallel systems, distributed databases, self-referential databases, and similar database systems). Here, one or more repositories may be located external to WWAP 110. In an embodiment, data store 119 comprises one or more self-referential databases. In an embodiment, data stores 199 can store information in an index structure to facilitate rapid searches. For example, text from each cell can be stored in a key word index which itself can be stored in the table. In several embodiments, the text cells may include pointers to the entries in the key word index and the key word index contains pointers to the cells. Here, this two way association can provide for extended queries. In certain embodiments, data stores 119 can store information in one or more logical tables each comprising: a plurality of logical rows each comprising an object identification number (OID) to identify that particular logical row, each logical row of the plurality of logical rows corresponding to a record of information; a plurality of logical columns intersecting the plurality of logical rows to define a plurality of logical cells, each logical column of the plurality of logical columns comprising an OID to identify that particular logical column; and one or more indexing elements each configured to index data stored in the logical table.

In certain embodiments, the structure of the table 700 can be a logical structure and not necessarily a physical structure. Here, memory 524 may be configured in accordance with several embodiments and need not store the table 700 contiguously. In other embodiments, the table 700 may further comprise a plurality of rows 710 and a plurality of columns 720. In yet still other embodiments, a row may correspond to a record while a column corresponds to an attribute of a record and the defining characteristics of the column are stored in a row 708. The intersection of a row and a column comprises a particular cell, in accordance with several embodiments. For example, each row may be assigned a unique object identification number (OID) stored in column 720 and each column also is assigned a unique OID, indicated in brackets and stored in row 708. For example, row 710 has an OID equal to "Sensor 1" while the column 722 has an OID equal to "COMPARE CYCLE 1". As will be described more fully below, for example, the OID's for both rows and columns may be used as pointers and a cell 734 may store an OID. The method for assigning the OID's will also be discussed below.

In certain embodiments, each row, corresponding to a record, may include information in each column; however, a row need not, and generally will not, have data stored in every column. For example, the type of information associated with a column is known as a 'domain'. Standard domains supported in most database systems include text, number, date, and Boolean. The present invention includes other types of domains such as the OID domain that points to a row or column. The present invention further supports 'user-defined' domains, whereby all the behavior of the domain can be determined by a user or programmer. For example, a user may configure a domain to include writing to and reading from a storage medium and handling operations such as equality testing and comparisons. In an embodiment, individual cells may be accessed according to their row and column OID's.

For example, using the cell as the unit of storage improves many standard data management operations known in the art that previously required the entire object or record (e.g., versioning, security, hierarchical storage management, appending to remote partitions, printing, and other standard data operations known in the art). Each column has an associated column definition, which determines the properties of the column, such as the domain of the column, the name of the column, whether the column is required and other properties that may relate to a column, in accordance with certain embodiments. The table 700 supports columns that include unstructured, free text data. In certain embodiments, the system must generate a unique OID when columns and rows are formed. In other embodiments, OID domains can be used to store OID's, which are pointers to other records. For example, an efficient query can use these OID's to go directly to another record, rather than searching through columns. In some embodiments, the logical tables may be structured and/or operationally defined in a manner similar to the logical tables disclosed in U.S. Pat. No. 6,151,604 filed Mar. 28, 1995, which is incorporated herein by reference in its entirety.

In some embodiments, device 118 can be a computing device configured to utilize any appropriate wireless communication protocol known in the art to communicate with one or more RF sources 120 (e.g., LTE, GSM/EDGE, UMTS/HSPA, Band 2/25 (1850 MHZ), Band 4 (1710-1755/2110-2155 MHz), Band 5 (824-894 MHZ), Band 13 (746-787 MHz), Band 17 (704-746 MHz), and/or Band 12 (699-746 MHz), as well as any high speed wireless communication protocol). In certain embodiments, device 118 can comprise one or more copies of antenna 114. For example, device 118 may comprise a multiple copies of antenna 114 conductively coupled together in one or more antenna arrays.

Device 118 can be configured to selectively utilize one or more of the antennas 114 conductively coupled thereto to communicate with one or more computing devices (e.g., RF sources 120), in accordance with some embodiments. Antennas 114 may be selected for such communication when their received signal strength is the highest amongst other antennas 114 and/or at least a threshold signal strength, in accordance with certain embodiments. Antenna 114 can be a dipole antenna, fractal antenna, patch antenna, and/or any conductive element that can be used to communicate with RF source 120, in accordance with certain embodiments.

For example, each of the antennas 114 of the antenna array may comprise a plurality of conductive elements each oriented at a different angle relative to each other and/or RF source 120 and thereby increase the probability that a desired signal strength can be achieved for one or more particular antennas 114. Mammalian body tissue is typically a lossy medium; hence waves propagating through mammalian body tissue may attenuate greatly prior to reaching the specific receiver. RF waves travel more slowly in a lossy medium. Not to be limited by theory, the further an antenna is positioned away from the body the closer its performance is to that in free space, which may also be influenced by antenna type, structure, and matching circuit. WWAP 110 may include one or more insulating layers on which antennas 114 may be positioned to reduce any "lossy" effect the antennas 114 may experience, in accordance with some embodiments.

For example, each antenna 114 can comprise one or more conductive elements, in accordance with some embodiments. For example, one or more of the conductive elements can be formed using a conductive composition ("the composition"). The composition can comprise one or more polymers and fully exfoliated single sheets of graphene, in accordance with some embodiments. The composition can include a polymer(s) and carbonaceous material consisting of individual graphene sheets, in accordance with other embodiments. Antenna 114, for example, can be printed on to a surface of a substrate and then affixed to WWAP 110 or printed directly on to a surface of WWAP 110. Antenna 114 may comprise one or more flexible conductive components and/or materials that facilitate conformance to dynamic and/or non-uniform surfaces, such as mammalian body types, in accordance with certain embodiments.

In some embodiments, the composition, substrates, and/or graphene sheets can be derived, printed, applied, and/or formed utilizing a variety of methods, including but not limited to methods disclosed in U.S. Pat. No. 7,658,901 B2 to Prud'Homme et al., U.S. Pat. No. 8,679,485 B2 to Crain et al., U.S. Pat. No. 8,278,757 B2 to Crain et al., and U.S. Patent Application No. 2011/0189452 A1 to Lettow et al., which are each hereby incorporated herein in their entirety. The graphene sheets preferably have a maximum surface area of 2630 $m^2/g$, in accordance with certain embodiments. In several embodiments, the graphene sheets are present in the polymer as a three-dimensional percolated network (e.g., a continuous three dimensional network comprising continuous chains of graphene sheets). In other embodiments, the three-dimensional percolated network comprises a graphene sheet network comprising nanometer scale separation at the contact points between individual sheets. In yet still other embodiments, individual graphene sheets may comprise imperfections in its lattice network (i.e., kinks) that facilitate the interlocking of individual graphene sheets in the percolated network.

Communication device 112 can be an electronic device that facilitates communication between computing devices 130 and WWAP 110 using one or more wireless communication standard known in the art, in accordance with an embodiment. For example, communication device 112 may comprise one or more electronic components (e.g., one or more transceivers that can communicate via one or more frequencies; one or more software- and/or hardware-based controllers that can control the reception and transmission functions of the transceiver; one or more duplexers and/or a diplexers).

Communication device 112, in certain embodiments, can comprise one or more antennas 115 that may be utilized to communicate with computing device (e.g., mobile devices 130) via transmission line 142 using Wi-Fi, Bluetooth and/or other similar wireless local area networking protocols that facilitates communication between computing devices 130 and WWAP 110. In certain embodiments, the antennas 115 can comprise conductive elements comprised of metals, metallic materials, conductive polymers, and/or the composition (discussed above). For example, antennas 115 can be formed utilizing methods similar to those of antennas 114.

WWAP 110, in some embodiments, can communicate with computing device 130 and source 120 via RF transmission lines 142 and 144, respectively. For example, usage of WWAP 110 is preferred when computing device's 130 received signal strength associated with transmission line 142 is greater than computing device's 130 received signal strength associated with transmission line 140 (e.g., because of the greater gain of antennas 114 compared to the antenna(s) of computing device 130). Transmission line 144 can typically include one or more wireless signals modulated according to one or more wireless communication protocols (e.g., LTE, 3G, 4G, or similar high speed data communication protocols).

Figure 2:
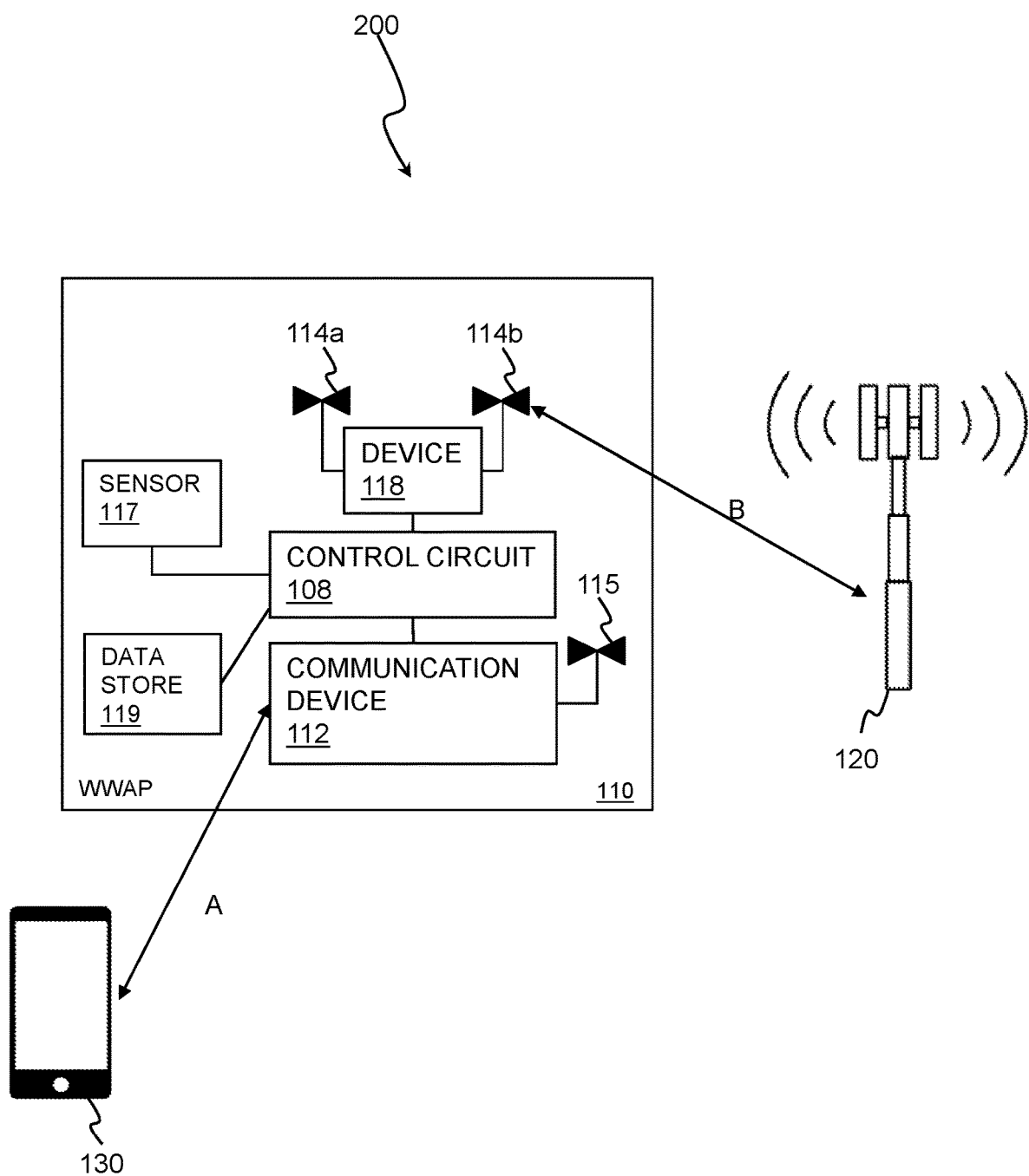
FIG. 2 illustrates a block diagram of a RF transmission scheme, generally 200, in accordance with several embodiments.

FIG. 2 depicts a block diagram of a RF transmission scheme ('scheme'), generally 200, in accordance with some embodiments. For example, scheme 200 can involve source(s) 120 and computing device(s) 130 in communication with WWAP 110, via transmission line B and transmission line A, respectively. In certain embodiments, RF transmission line A can comprise wireless signals modulated according to Wi-Fi, Bluetooth, and/or similar wireless local area networking communication protocols. RF transmission line B, in other embodiments, can comprise wireless signals modulated according to 4G, 3G, LTE, and/or or similar high speed wireless communication protocols.

As discussed above, users can utilize WWAP 110, to facilitate communication between RF sources 120 and computing devices 130. In certain embodiments, WWAP 110 can comprise a plurality of antennas 114 (e.g., antennas 114a and 114b) each having a particular orientation relative to RF source 120. Computing device 130 and RF source 120 can typically communicate wirelessly with each other directly (e.g., via transmission line 140 discussed above), but the signal strength computing device 130 is insufficient to support communication of a desired quality (e.g., a threshold signal strength) due to environmental conditions (discussed above).

In some embodiments, the signal strength received at each particular copy of antenna 114 are compared to each other ("compare cycle"). For example, during each compare cycle, in response to determining that the computing device's 130 received signal strength is insufficient (e.g., below a threshold signal strength) for desired communication, communication between device 118 and RF source 120 is initiated. Antennas 114a and 114b are activated. In response to determining that antenna 114b is receiving a stronger signal (e.g., a higher dBm value) associated with transmission signal B compared to antenna 114a, antenna 114a is deactivated.

In certain embodiments, compare cycles can be initiated at pre-determined time intervals. In other embodiments, compare cycles can be initiated in response to determining that an antenna 114 is receiving a signal below a threshold signal strength. In some embodiments, compare cycles can be initiated when acceleration data captured by sensor 117 (e.g., functioning as an accelerometer or similar device) reflects an acceleration value greater than a threshold acceleration rate. For example, sensor 117 can be a computing device that captures acceleration data. When the captured acceleration data is greater than a predetermined threshold acceleration rate, WWAP 110 is assumed to have changed orientation relative to RF source 120. In response to determining one or more orientational changes associated with WWAP 110, a compare cycle is initiated. Such orientational changes may have a negative impact on reception and should be monitored to ensure that one or more antennas 114 are oriented relative to RF source 120 in a manner to receive RF signals at a threshold signal strength or more.

In still other embodiments, sensor 117 can be a computing device that captures positional information associated with the WWAP 110. For example, compare cycles can be initiated in response to determining that positioned information captured via sensor 117 reflects that WWAP 110 has traversed a distance that is greater than a threshold distance.

Figure 3:
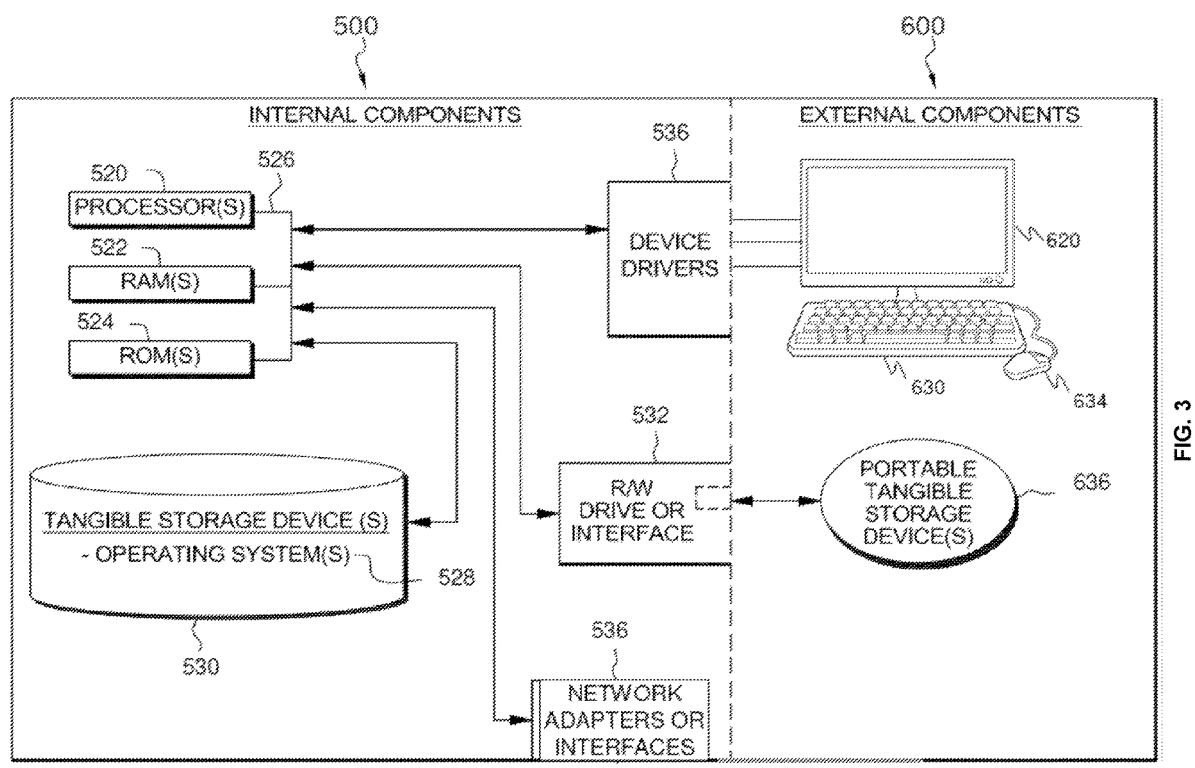
FIG. 3 depicts a block diagram of components of a computing device, in accordance with some embodiments.

FIG. 3 depicts a block diagram of components of computing devices 110, in accordance with several embodiments. Data processing system 500, 600 is representative of any electronic device capable of executing machine-readable program instructions. Data processing system 500, 600 may be representative of a smart phone, a computer system, PDA, or other electronic devices. Examples of computing systems, environments, and/or configurations that may represented by data processing system 500, 600 include, but are not limited to, personal computer systems, server computer systems, thin clients, thick clients, wearable computer, handheld or laptop devices, multiprocessor systems, microprocessor-based systems, network PCs, minicomputer systems, and distributed cloud computing environments that include any of the above systems or devices.

Communication device 112 includes respective sets of internal components 500 and external components 600 as illustrated in FIG. 3. Each of the sets of internal components 500 includes one or more processors 520, one or more computer-readable RAMs 522 and one or more computer-readable ROMs 524 on one or more buses 526, and one or more operating systems 528 and one or more computer-readable tangible storage devices 530. Data can be stored on one or more of the respective computer-readable tangible storage devices 530 for execution by one or more of processors 520 via one or more of the respective RAMs 522 (which typically include cache memory). In the embodiment illustrated in FIG. 3, each of the computer-readable tangible storage devices 530 is a magnetic disk storage device of an internal hard drive. Alternatively, each of the computer-readable tangible storage devices 530 is a semiconductor storage device, such as ROM 524, EPROM, flash memory or any other computer-readable tangible storage device that can store a computer program and digital information.

Internal components 500 also include a R/W drive or interface 532 to read from and write to one or more portable computer-readable tangible storage devices 636, such as a CD-ROM, DVD, memory stick, magnetic tape, magnetic disk, optical disk or semiconductor storage device. Data can be stored on one or more of the respective portable computer-readable tangible storage devices 636, read via the respective R/W drive or interface 532 and loaded into the respective computer-readable tangible storage devices 530.

Each set of internal components 500 also includes network adapters or interfaces 536 such as a TCP/IP adapter cards, wireless Wi-Fi interface cards, or 3G or 4G wireless interface cards or other wired or wireless communication links. Data can be downloaded to communication device 112, respectively, from an external computer via a network (for example, the Internet, a local area network or other, wide area network) and respective network adapters or interfaces 536. From the network adapters or interfaces 536, data is loaded into the respective computer-readable tangible storage devices 530. The network may comprise copper wires, optical fibers, wireless transmission, routers, firewalls, switches, gateway computers and/or edge servers.

Each of the sets of external components 600 can include a computer display monitor 620, a keyboard 630, and a computer mouse 634. External components 600 can also include touch screens, virtual keyboards, touch pads, pointing devices, and other human interface devices. Internal components 500 also include device drivers 540 to interface to computer display monitor 620, keyboard 630 and computer mouse 634. The device drivers 540, R/W drive or interface 532 and network adapters or interfaces 536 comprise hardware and software (stored in storage device 530 and/or ROM 524).

Computer program code for carrying out operations of at least one of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, though the Internet using an Internet Service Provider).

Figure 4:
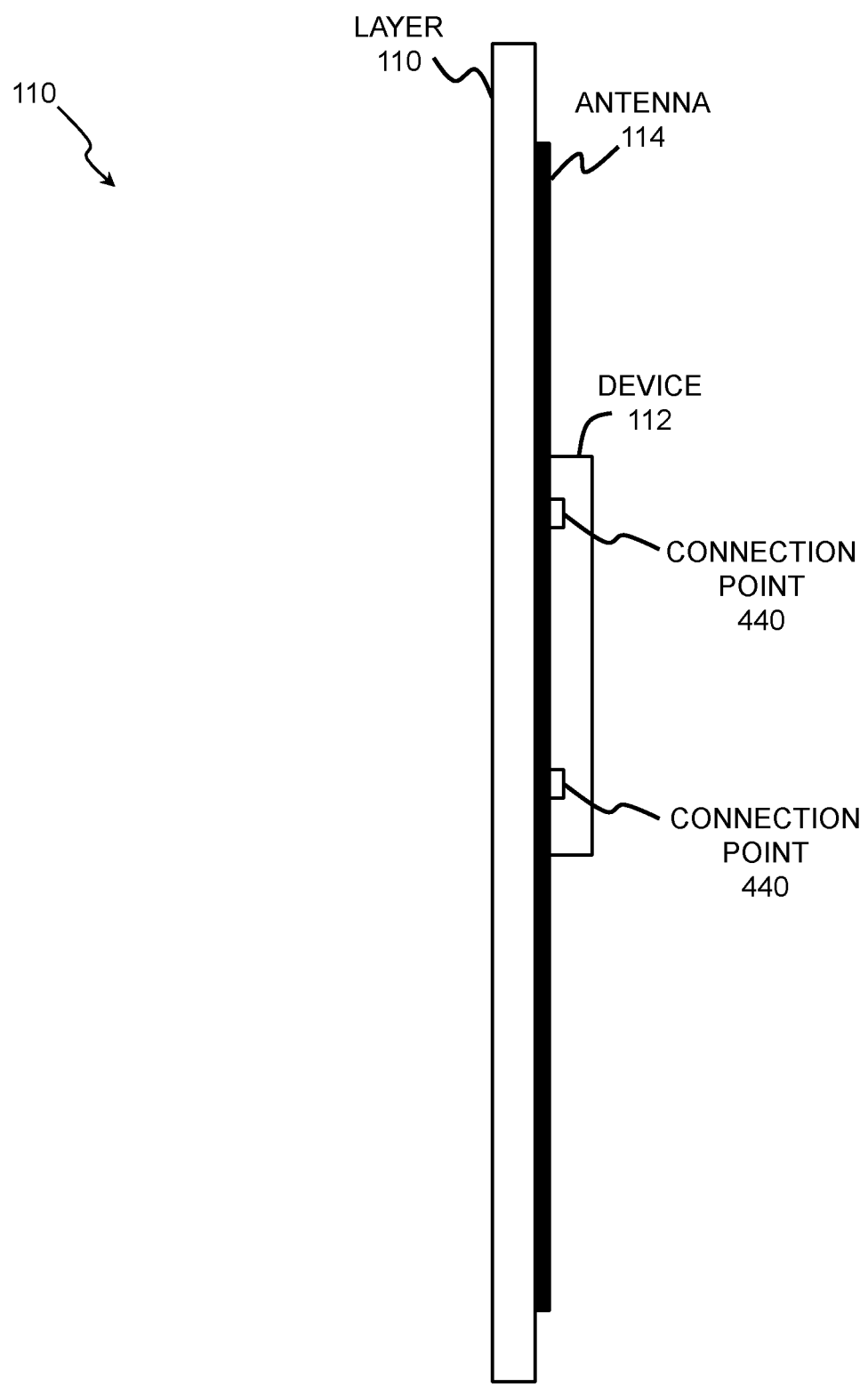
FIG. 4 illustrates a cross section view of a WWAP 110, layer 400, antenna 114, device 118, and connection points 440, in accordance with several embodiments.
Figure 5:
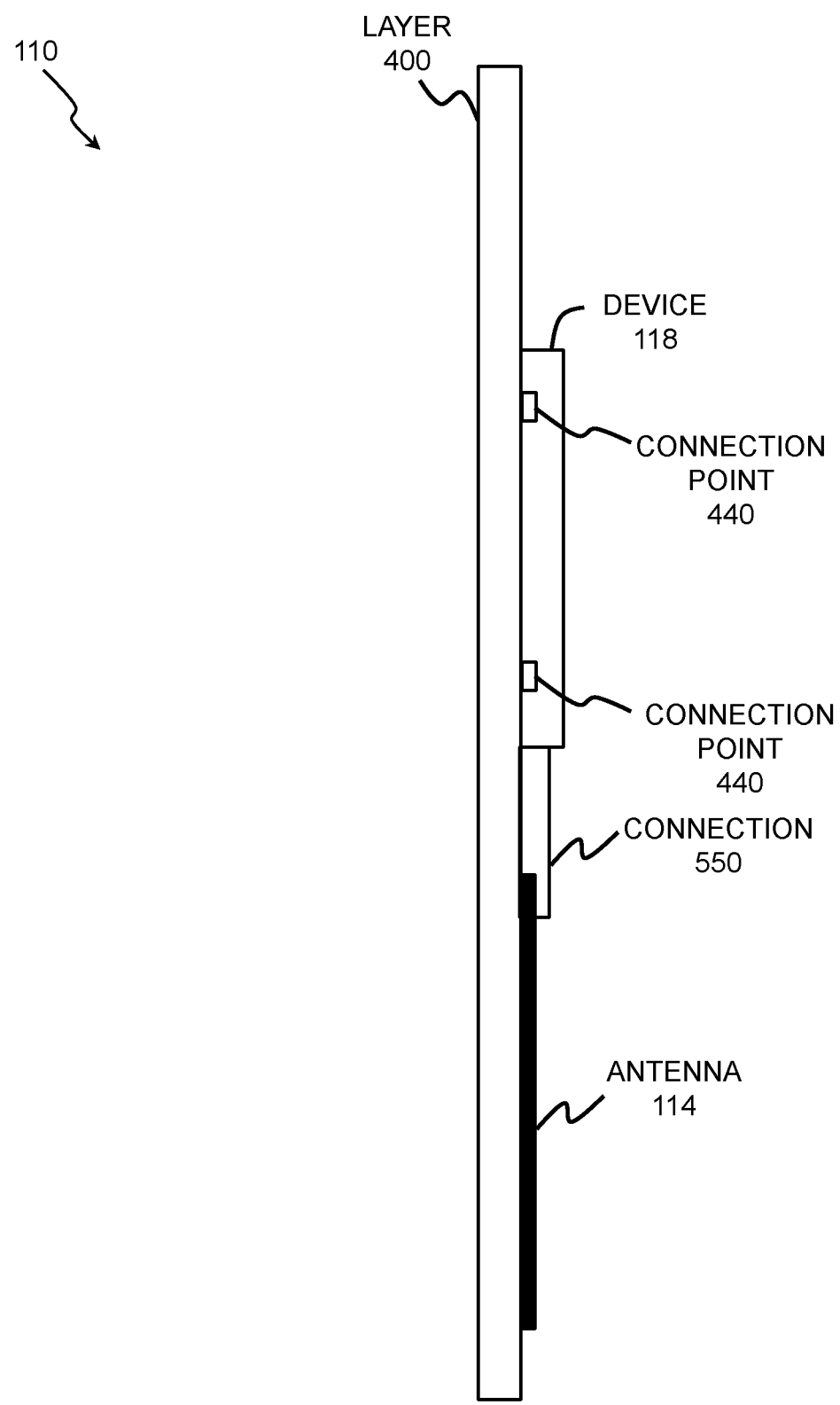
FIG. 5 illustrates a cross section view of the WWAP 110, layer 400, antenna 114, device 118, connection points 440, and connection 550, in accordance with some embodiments.

FIG. 4 illustrates a cross section view of WWAP 110, layer 400, antenna 114, device 118, and connection points 440, in accordance with several embodiments. FIG. 5 illustrates a cross section view of the WWAP 110, layer 400, antenna 114, device 118, connection points 440, and connection 550, in accordance with some embodiments. Although FIGS. 4 and 5 discuss device 118 and antenna 114, such discussion can be applied to communication device 112 and antenna 115 as well. In certain embodiments, antenna 114 can applied to a surface of layer 400 of WWAP 110. In other embodiments, applicable application methods include, but are not limited to, screen printing, electrohydrodynamic printing, and additive manufacturing (e.g., "3D printing"). Device 118 can be affixed to antenna 114 via one or more connection points 440, in accordance with some embodiments.

For example, connection points 440 can be solder points, matching connectors, electrically conductive adhesive, or other applicable conductive coupling method. Although not shown, communication device 112 can be further affixed to antenna 114 and/or layer 400 via an adhesive (e.g., a non-electrically conductive adhesive that may allow thermal conduction). In other embodiments, antenna 114 and device 118 can be applied to a surface of layer 500 of WWAP 110 distal to each other. In yet still other embodiments, connection 550 can be applied on to and/or within layer 400 to conductively couple device 118 and antenna 114. For example, connection 550 may comprise a conductive tab, a conductive adhesive, and/or soldering material, a metallic material, metals, conductive polymers, as well as similar electrically conductive materials.

Figure 6:
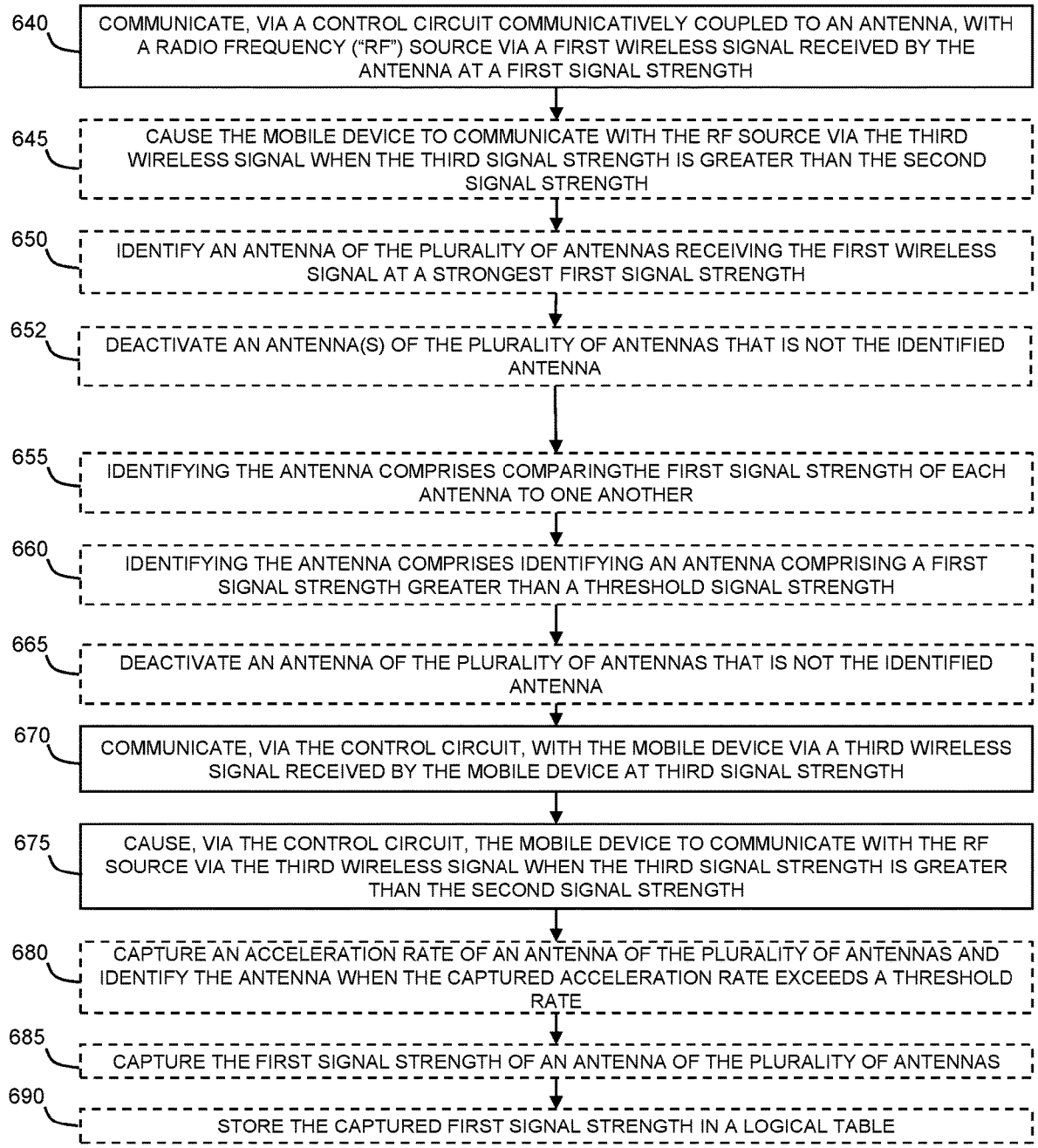
FIG. 6 illustrates operation steps of the system to enable communication between computing device of FIG. 1, according to several embodiments.

FIG. 6 illustrates operation steps of the system to enable communication between computing device, the RF source, and the WWAP of FIG. 1, according to several embodiments. At step 640, device 118 communicates, via control circuit(s) 108 communicatively coupled to antenna(s) 114, with RF source(s), e.g., RF source 120, via a first wireless signal received by the antenna at a first signal strength. For example, RF source 120 can be conductively coupled to a mobile device (e.g., computing device 130) via a second wireless signal, the mobile device receiving the second wireless signal at a second signal strength. In some embodiments, the control circuit(s) 108 can be positioned proximate to a surface(s) of a wearable item. In other embodiments, the RF source 120 can be a component of a cellular network.

In yet still other embodiments, antenna(s) 114 may comprise a conductor element(s). For example, each conductor element may comprise a polymer and fully exfoliated graphene sheets. In several embodiments, communicating with the RF source(s) comprises the communication device(s) 112 communicating via the control circuit(s) communicatively coupled to the antenna(s) 114, with the RF source(s) 120 via the first wireless signal (step 645). Here, for example, antenna 114 can comprise a plurality of antennas conductively coupled together in one or more antenna arrays each receiving the first wireless signal at a particular first signal strength. At step 650, an antenna(s) of the plurality of antennas can be identified that receives the first wireless signal at a strongest first signal strength, in accordance with some embodiments.

At step 652, deactivating, via the control circuit, an antenna(s) of the plurality of antennas that is not an identified antenna is deactivated, in accordance with several embodiments. At step 655, identifying the antenna can comprises comparing, via the control circuit, the first signal strength of each antenna of the plurality of antennas to one another thereby identifying an antenna(s) of the plurality of antennas that are receiving the first wireless signal at a strongest first signal strength, in accordance with certain embodiments. In several embodiments, identifying the antenna(s) may comprises identifying one or more antennas of the plurality of antennas that may comprise a first signal strength greater than a threshold signal strength (step 660).

In additional embodiments, at step 670, communication device 112 can communicate, via the control circuit(s) 108, with the mobile device via a third wireless signal received by the mobile device at third signal strength. In some embodiments, at step 675, the mobile device is caused to communicate with the RF source(s) via the third wireless signal when the third signal strength is greater than the second signal strength. At step 680, capturing, communicatively coupled to the control circuit, via a sensor(s), e.g., sensor 117, an acceleration rate of one or more antennas of the plurality of antennas, in accordance with several embodiments. In certain embodiments, identifying the antenna can comprise identifying the antenna(s) of the plurality of antennas when the captured acceleration rate of the antenna exceeds a threshold acceleration rate.

One or more sensors are conductively coupled to the control circuit. At step 685, in additional embodiments, the first signal strength of an antenna(s) of the plurality of antennas is captured via a sensor(s), e.g., sensor 117. In other embodiments, the captured first signal strength can be stored in a logical table (step 690). In some embodiments, data store 119 can include file(s) 150. In other embodiments, file(s) 150 can comprise data captured by one or more sensors 117, in accordance with some embodiments.

In certain embodiments, the logical table can include a plurality of logical rows each comprising one or more object identification numbers (OID) to identify that particular logical row, where each logical row of the plurality of logical rows can correspond to one or more records of information. In other embodiments, the logical table can include a plurality of logical columns intersecting the plurality of logical rows to define a plurality of logical cells, where each logical column of the plurality of logical columns comprising an OID to identify that particular logical column. In yet still other embodiments, data stored in the logical table can be indexed by an indexing element(s).

In some embodiments, a system and a corresponding method performed by the system, includes: one or more radio frequency ("RF") sources included in a cellular network (e.g., cell site/tower, base transceiver station, telecommunication node, as well as any computing device that can transmit and/or receive RF's). Each mobile computing devices may be communicatively coupled to one of the RF sources via a first wireless signal received by the mobile computing device at a first signal strength. The first wireless signal can be modulated via a cellular communication protocol.

The system, for example, may also include one or more wearable items each having a surface(s). At least one antenna can be positioned proximate to one of the surfaces and comprising one or more conductor elements. Each of the conductor elements may include a polymer(s) and fully exfoliated graphene sheets. One or more control circuits can be positioned proximate to the surface and communicatively coupled to at least one of the antennas. At least one of the control circuit may be configured to communicate, via the antenna(s), with the RF source via a second wireless signal received by the antenna(s) at a second signal strength, the second wireless signal modulated via the cellular communication protocol(s).

At least one of the control circuits may be configured to communicate, via a second antenna(s) communicatively coupled to the control circuit, with the mobile device(s) via a third wireless signal(s) received by the mobile device at a third signal strength, the third wireless signal modulated via a non-cellular wireless communication protocol(s). The control circuit may be configured to cause each of the mobile devices to communicate with one of the RF sources via the third wireless signal(s) when the third signal strength is greater than the first signal strength.

In some embodiments, one or more of the antennas each include a plurality of antennas conductively coupled together in one or more antenna arrays. For example, at least one of the control circuits may be configured to communicate, via one or more antennas of the plurality of antennas, with one or more of the RF sources via the second wireless signal, each of the plurality of antennas receiving the second wireless signal at a particular second signal strength; identify one or more antennas of the plurality of antennas receiving the second wireless signal at a strongest second signal strength; and deactivate the antennas of the plurality of antennas that are not identified.

In other embodiments, the control circuits can be configured to identify the antenna at predetermined intervals. The system may further include one or more sensors each configured to capture an acceleration of at least one of the antennas of the plurality of antennas, in accordance with several embodiments. For example, the step of identifying at least one of the antennas can include identifying, using sensor data, the antennas of the plurality of antennas when the captured acceleration data of the identified antenna exceeds a threshold rate. In still other embodiments, the step of identifying the antennas of the plurality of antennas receiving the second wireless signal at the strongest second signal strength can include comparing the second signal strength of each antenna of the plurality of antennas and thereby identify antennas of the plurality of antennas that are associated with the strongest second signal strength.

In yet still other embodiments, the step of identifying antennas of the plurality of antennas receiving the second wireless signal at the strongest second signal strength can include identifying antennas of the plurality of antennas receiving the particular second signal strength at a threshold signal strength or greater. In several embodiments, one or more of the control circuits can each be selectively (e.g., user-defined) positioned proximate to the surface (i.e., have various attachment points/sites on the surface and/or on other surfaces of the wearable item). In other embodiments, one or more of the antennas can be selectively (e.g., user-defined) positioned proximate to the surface (i.e., have various attachment points/sites on the surface and/or on other surfaces of the wearable item).

In additional embodiments, the system may further include one or more sensors each conductively coupled to at least one of the control circuits and configured to capture the second signal strength of one or more antennas of the plurality of antennas. For example, each control circuit can be configured to store the captured second signal strength in one or more logical tables each comprising: a plurality of logical rows each comprising an object identification number (OID) to identify that particular logical row, each logical row of the plurality of logical rows corresponding to a record of information; a plurality of logical columns intersecting the plurality of logical rows to define a plurality of logical cells, each logical column of the plurality of logical columns comprising an OID to identify that particular logical column; and one or more indexing elements each configured to index data stored in the logical table.

In several embodiments, the method may include communicating, via a control circuit(s) communicatively coupled to at least one antenna, with a radio frequency ("RF") source(s) via a first wireless signal received by the antenna at a first signal strength, each of the RF sources can be conductively coupled to one or more mobile devices via a second wireless signal, each mobile device can receive the second wireless signal at a second signal strength. For example, each of the control circuits can be positioned proximate to a surface of a wearable item, at least one of the RF sources can be included in at least one cellular network. Each antenna, for example, may include one or more conductor elements each comprising a polymer(s) and fully exfoliated graphene sheets.

In several embodiments, the method may include communicating, via the control circuit(s), with at least one of the mobile devices via a third wireless signal received by each of the mobile devices at third signal strength. In other embodiments, the method may include causing, via one or more of the control circuits, at least one of the mobile devices to communicate with one or more of the RF sources via the third wireless signal when the third signal strength is greater than the second signal strength. In yet still other embodiments, the step of communicating with at least one of the RF sources includes communicating, via at least one of the control circuits communicatively coupled to the antenna, with at least one of the RF sources via the first wireless signal, at least one of the antennas can include a plurality of antennas conductively coupled together in one or more antenna arrays.

Here, for example, each of the plurality of antennas can receive the first wireless signal at one or more particular first signal strengths. In some embodiments, the step of communicating with at least one of the RF sources includes identifying, via one or more of the control circuits, one or more antennas of the plurality of antennas receiving the first wireless signal at a strongest first signal strength; and deactivating, via one or more of the control circuits, at least one of the antennas of the plurality of antennas that is not an identified antenna.

In other embodiments, the step of identifying the antenna includes comparing, via one or more of the control circuits, the first signal strength of each antenna of the plurality of antennas to one another thereby identifying antennas of the plurality of antennas receiving the first wireless signal at a strongest first signal strength. In yet still other embodiments, the step of identifying the antenna(s) includes identifying, via at least one of the control circuits, at least one of the antennas of the plurality of antennas comprising a first signal strength greater than a threshold signal strength. In several embodiments, the method further includes capturing, via one or more sensors communicatively coupled to at least one of the control circuits, an acceleration rate for one or more antennas of the plurality of antennas. In other embodiments, the step of identifying the antenna(s) can include identifying the antenna(s) of the plurality of antennas when the captured acceleration rate of the antenna exceeds a threshold rate.

In several embodiments, the method can include capturing, via one or more sensors each conductively coupled to one or more of the control circuits, the first signal strength of an antenna of the plurality of antennas; and storing, via one or more of the control circuit, the captured first signal strength in one or more logical tables. Here, for example, a logic table may include a plurality of logical rows each comprising one or more object identification numbers (OID) to identify that particular logical row (e.g., each logical row of the plurality of logical rows may correspond to one or more records of information); a pluralities of logical columns intersecting the plurality of logical rows to define a plurality of logical cells, each logical column of the plurality of logical columns can include one or more OIDs to identify that particular logical column; and one or more indexing elements that indexes data stored in one or more of the logical table.

As various modifications could be made in the constructions and methods herein described and illustrated without departing from the scope of some of the embodiments, it is intended that all matter contained in the foregoing description or shown in the accompanying drawings shall be interpreted as illustrative rather than limiting. Thus, the breadth and scope of the embodiments should not be limited by any of the above-described exemplary embodiments, but should be defined only in accordance with the following claims appended hereto and their equivalents.

What is claimed is:

1. A system to enable communication between computing devices comprising:
    a radio frequency ("RF") source included in a cellular network;
    a mobile computing device communicatively coupled to the RF source via a first wireless signal modulated via a cellular communication protocol and comprising a first signal strength;
    a wearable item comprising:
        a device comprising an antenna array and communicatively coupled to the RF source;
        a communications device communicatively coupled to the mobile computing device;
        a control circuit communicatively coupled to the device, the communications device, and a sensor;
    wherein
        the wearable item is a baggage item or a garment item;
        the control circuit is configured to:
            communicate, via the device, with the RF source via a second wireless signal received at a second signal strength, the second wireless signal modulated via the cellular communication protocol;
            communicate, via the communications device, with the mobile device via a third wireless signal received at a third signal strength, the third wireless signal modulated via a non-cellular wireless communication protocol;
            cause the mobile device to communicate with the RF source via the third wireless signal when the second signal strength is greater than the first signal strength;
            capture, via the sensor, acceleration data associated with the wearable item;
            capture, via the sensor, positional data associated with the wearable item;
            when the acceleration data is greater than a threshold acceleration rate or the positional data reflects that the wearable item moved a distance greater than a threshold distance, identify an antenna of the antenna array receiving a highest signal strength of the antenna array or a threshold signal strength; and
            select the identified antenna for communication with the RF source.

2. The system of claim 1, wherein
    the antenna array comprises a second antenna;
    the first antenna comprises a conductive composition;
    the conductive composition comprises a polymer and carbonaceous material consisting of fully exfoliated single sheets of graphene; and
    the graphene sheets are present in the polymer as a three-dimensional percolated network.

3. The system apparatus of claim 2, wherein
    the wearable apparatus is a garment or a baggage item;
    the baggage item is selected from a group consisting of: a backpack, a suitcase, a purse, a shoulder bag, a duffle bag, luggage, a pouch, and a pocketbook; and the garment item is selected from a group consisting of: a shirt, a trouser, a skirt, a dress, a vest, a uniform, headwear, a saddles, and harness.

4. The system apparatus of claim 3, wherein
the communications device comprises a first antenna; and
the first antenna comprises the conductive composition.

5. The system apparatus of claim 4, wherein the signal strength of the first radio frequency signal is greater than the signal strength of second radio frequency signal.

6. The system apparatus of claim 5, wherein
the antenna array comprises a plurality of conductive elements each oriented at a different angle relative to each other.

7. The system apparatus of claim 6, wherein
the wearable item comprises a datastore;
the datastore comprises a self-referential database; and
the control circuit is configured to store at least one of the acceleration data and positional data in the self-referential database.

* * * * *